United States Patent [19]

Sander et al.

[11] Patent Number: 4,888,680
[45] Date of Patent: Dec. 19, 1989

[54] PERIPHERAL DEVICE INTERFACE AND CONTROLLER

[75] Inventors: Wendell Sander, Los Gatos; Dick Huston, Boulder Creek; Walter Broedner; Clifford Huston, both of Saratoga, all of Calif.

[73] Assignee: Little Blue Limited Partnership, Campbell, Calif.

[21] Appl. No.: 108,064

[22] Filed: Oct. 14, 1987

[51] Int. Cl.⁴ .................. G06F 15/16; G06F 13/10
[52] U.S. Cl. ............................. 364/200; 364/228; 364/280; 364/284.2; 364/232.3
[58] Field of Search ... 364/200 MS File, 900 MS File

[56] References Cited

U.S. PATENT DOCUMENTS 4,443,850  4/1984  Harris .................................. 364/200
4,648,034  3/1987  Heninger ............................ 364/200

OTHER PUBLICATIONS

Moskowitz, R., "Appli-Card—Enhancing Your Apple", Interface Age, (Aug. 1983), pp. 107-111.
Heck, M., "Quadlink", Interface Age, (May, 1984), pp. 108-110.
Morganstein, D., "ALF's 8088", Byte, (Dec. 1984), pp. A38-A43.
Peck, R., "Expanding Your Apple's Applications", Byte, (Dec. 1984), pp. A45-A126.

Primary Examiner—Raulfe B. Zache
Assistant Examiner—Glenn Richman
Attorney, Agent, or Firm—Blakely, Sokoloff, Taylor & Zafman

[57] ABSTRACT

A port emulator circuit implemented on an Apple II peripheral card which enables MS-DOS programs designed to run on an 8086 microprocessor based IBM type personal computer to perform input/output operations on peripheral devices used by 6502 microprocessor based Apple II computers. As the 8086 requires I/O, a state machine, which forms part of the port emulator, performs the required bus arbitration between the 8086 and the 6502 and informs the 6502 of pending requirements of the 8086. The 6502 determines the type of I/O required, and using Apple II hardware resource, performs the I/O operation. The 6502 also places status information concerning the I/O operation in a portion of RAM on the peripheral card, which RAM location emulate the I/O registers found on IBM personal computers.

3 Claims, 6 Drawing Sheets

PERIPHERAL DEVICE INTERFACE AND CONTROLLER

BACKGROUND OF THE INVENTION

The present invention is directed to an input/output ("I/O") port emulator implemented on a peripheral card for use in connection with a peripheral expansion slot on the Apple II family of computers sold by Apple Computer, Inc. of Cupertino, Calif. More particularly, the invented port emulator, when installed in an Apple II computer, enables the Apple II computer to run software written for personal computers of the type sold by International Business Machines Corporation ("IBM") under the MS-DOS and equivalent operating systems. The present invention utilizes Apple II peripherals such as printers, modems, mouse, and disk drives.

In the following description, references will be made to 8086 microprocessors to represent the family of microprocessors used by IBM personal computers and to 6502 microprocessors for the family of microprocessors used by Apple II personal computers. Various references will be made to the particular architectures of the 8086 and 6502 microprocessors for ease of understanding by those skilled in the relevant art who will be familar with such architectures. Details such as the technique for interfacing peripheral cards with the expansion slots in the Apple II computer will not be set forth herein inasmuch as such details are well known to those skilled in the art.

SUMMARY OF THE INVENTION

The present invention is directed to a port emulator circuit implemented on an Apple II peripheral card which enables MS-DOS programs designed to run on an 8086 microprocessor based IBM type personal computer to perform input/output operations on peripheral devices used by 6502 microprocessor based Apple II computers. As the 8086 requires I/O, a state machine, which forms part of the port emulator, performs the required bus arbitration between the 8086 and the 6502 and informs the 6502 of pending requirements of the 8086. The 6502 detemines the type of I/O required, and using Apple II hardware resources, performs the I/O operation. The 6502 also places status information concerning the I/O operation in a portion of RAM on the peripheral card, which RAM locations emulate the I/O registers found on IBM personal computers.

DETAILED DESCRIPTION OF THE INVENTION

Figure 1:
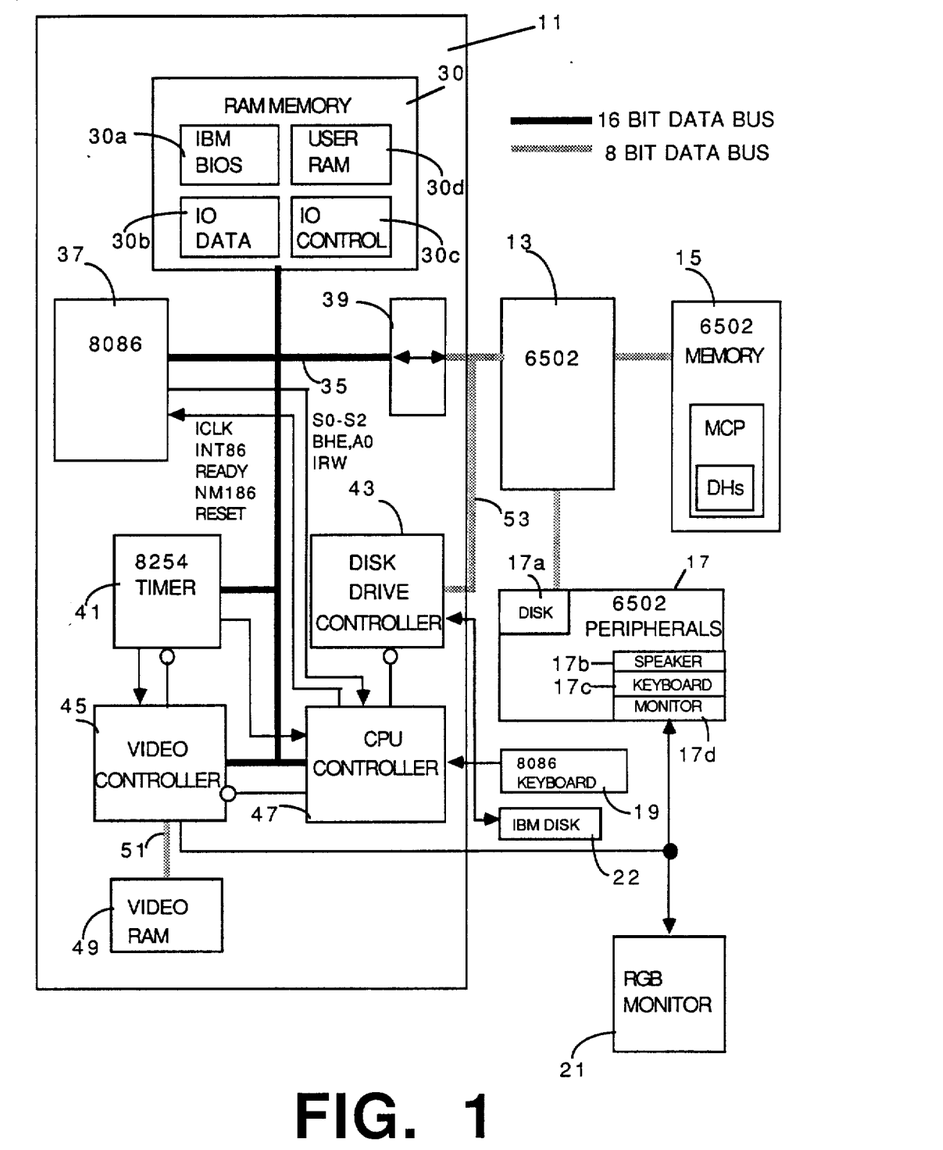
FIG. 1 is an overview block diagram of the I/O port emulator.

FIG. 1 is a block diagram showing the invented port emulator 11 and its relationship to an Apple II 6502 microprocessor 13, memory 15, peripherals 17 used by the 6502 including a disk drive 17a, speaker 17b, keyboard 17c and monitor 17d, an optional keyboard 19, optional RGB monitor 21 and disk drive 22 used by an IBM 8086 type microprocessor.

The port emulator 11 comprises RAM memory 30 which is divided into four portions as follows: IBM BIOS 30a; I/O data registers 30b; I/O control registers 30c; and user RAM 30d. The RAM 30 is coupled via a 16 bit data bus 35 to an 8086 microprocessor 37, data transreceiver 39, timer 41, video controller 45, and CPU controller 47. A video RAM 49 is coupled to video controller 45 via 8-bit data bus 51. The port emulator further comprises disk drive controller 43 which is coupled directly to the 6502 8-bit data bus 53.

RAM 30:

IBM BIOS 30a contains what is known as the basic input-output systems which controls all input output operations between peripheral hardware and the 8086. Such code is well known and will not be described herein.

In order to speed up execution of I/O instructions, the present invention uses a separate I/O register (I/O control registers or bytes 30c) for each data register emulated in RAM (I/O data registers or bytes 30b). This second register is used by the 6502 as a control register to inform the port emulator of the serviceability of an I/O resource. The 6502 can thus perform true co-processing by informing the emulator as to the current status of the information found in each I/O register. CPU controller 47 contains a state machine which, upon an I/O fetch by the 8086, examines the control register information for that I/O address as deposited by the 6502, and immediately executes the 8086 instruction or holds the 8086 waiting until the 6502 has finished processing the information and modifies the I/O data register (I/O data registers 30b) at the I/O address. The I/O data registers are the RAM equivalents of the I/O registers usually found in IBM type peripherals.

Figure 4A:
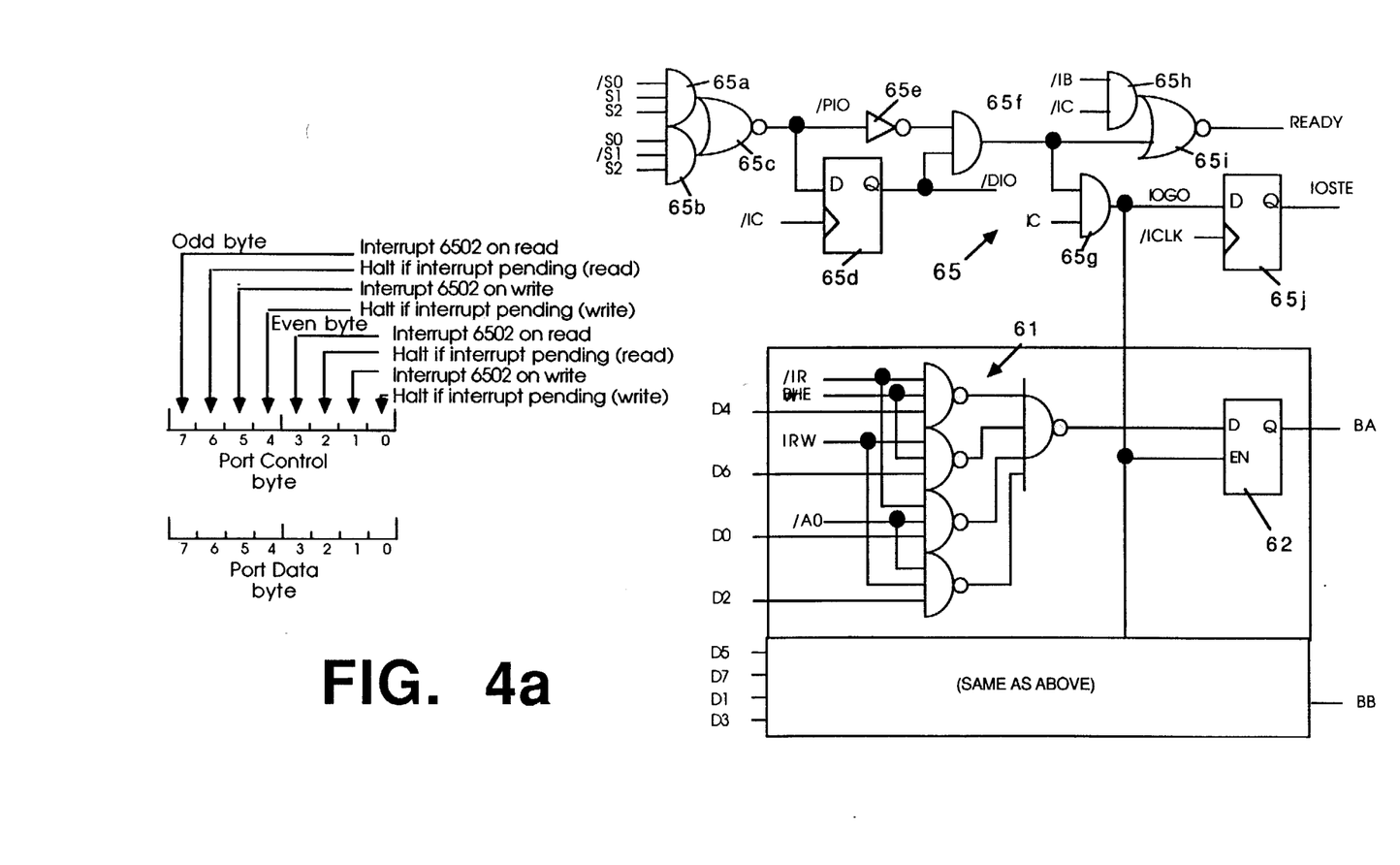
FIG. 4a is a schematic diagram showing the implementation of the I/O fetch logic of the CPU controller.

I/O control bytes 30c are bytes in RAM 30 accessible by the 6502. Every 8086 I/O data byte or port 30b has its own control byte 30c associated with it. Each control byte informs state machine 79 what is to be done during the read or write of its corresponding port. The control bytes control the operation of the 8086, and whether or not the 6502 is interrupted during or after a port access by the 8086. As shown in FIG. 4a, the high order four bits are utilized when reading or writing odd I/O data bytes and the low order four bits are utilized when reading or writing even I/O data bytes. The usage of the I/O control bytes will be described in conjunctions with the operation of state machine 79.

User RAM 30d is RAM used by MSDOS and 8086 application programs.

Video Controller 45

Video controller 45 is a circuit which performs the functions of an IBM color graphics adaptor (CGA) peripheral unit. Besides the aforementioned function, the video controller also allows an optional RGB color monitor 21 to be supported by the video controller. Such circuitry, including the necessary interfacing with video RAM 49, are well known to those skilled in the art and, therefore, need not be described herein.

Timer 41

Timer 41 is an off-the shelf timer such as an 8254 available from Intel Corporation that is used to perform the following functions:

| Function | Destination |
| --- | --- |
| Real Time Clock | CPU Controller 47 |
| RAM Refresh | CPU Controller 47 |
| Speaker | Video Controller 45 |

Figure 2:
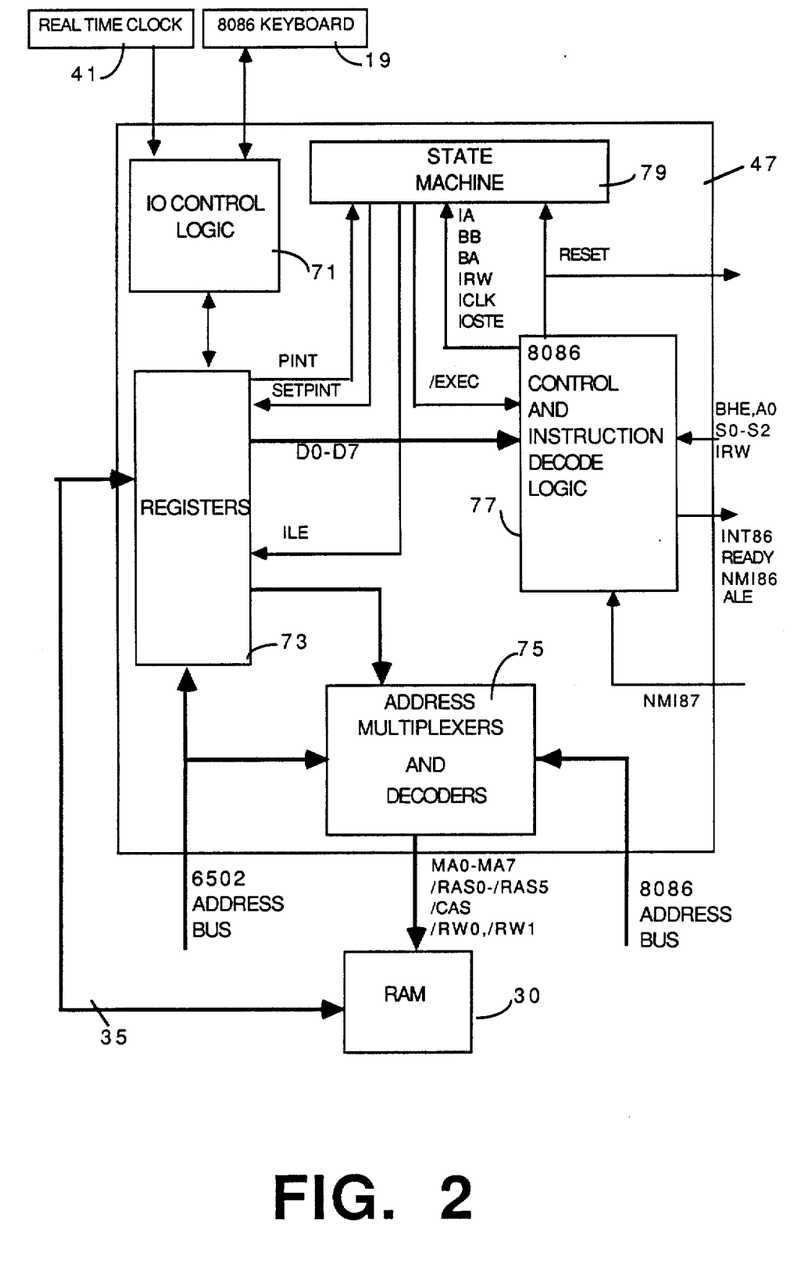
FIG. 2 is a detailed block diagram of the CPU controller which comprises the subject invention.

CPU Controller 47:

FIG. 2 is a block diagram of CPU controller 47. As can be seen from FIG. 2 the CPU controller comprises five logic blocks:

(1) I/O Control Logic 71: This block comprises circuitry dedicated to support the real time clock 41 and keyboard 19. Such circuitry is well known to those skilled in the art and, therefore will not be described herein.

Figure 3:
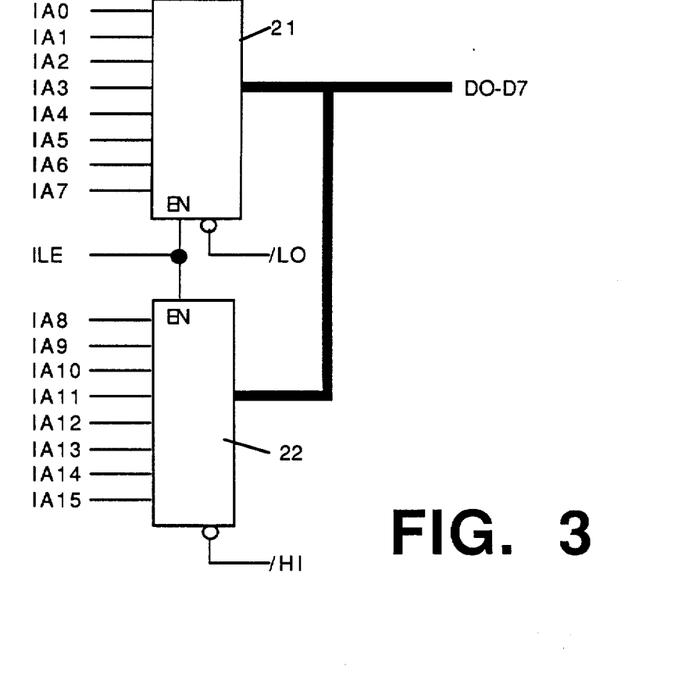
FIG. 3 is a schematic diagram showing the implementation of the I/O status latching used by the CPU controller.

(2) Registers 73: This block comprises registers containing information regarding: interrupt status, 8086 I/O status, and 8086 keyboard data. The block also contains the registers used by the 6502 to address the port emulator RAM. Two registers are used as page registers, and one register is a twenty bit down-loadable counter. The information contained in registers 73 is received from and transmitted to the 6502 on bus 35. Bus 35 is 16 bits wide to accomodate the 8086 16 bit data bus, but only 8 bits (D0–D7) are used by CPU controller 47. FIG. 3 shows the logic needed to capture the address of the I/O port referenced by the 8086. Specifically, the low order 8 bits of 16 bit bus 35 are latched in latch 21 and the high order 8 bits are latched in latch 22 on ILE generated by state machine 79. The low order bits are placed on D0–D7 of bus 35 on $\overline{LO}$ and the high order bits are placed on D0–D7 of bus 35 on $\overline{HI}$. $\overline{LO}$ and $\overline{HI}$ are internally decoded by CPU controller 47 from the 6502 address bus. The remaining details of the construction of register 73 will be apparent to those skilled in the art of constructing interfaces for the Apple II I/O slots.

(3) Address Multiplexers and Decoders 75: This block multiplexes and decodes the 6502 and 8086 address buses for RAM accesses. The details of such circuitry will be apparent to those skilled in the art.

(4) 8086 Control and Instruction Decode Logic 77: This block generates all the signals necessary to control the 8086 from the 6502. The block also contains logic to decode the micro-instruction, from S0–S2, that the 8086 is about to execute. The details of such circuitry are described below in conjunction with FIGS. 4a and 4b. An interrupt NMI87 from an optional 8087 (math coprocessor) is intercepted and masked by a register from register block 73 and delivered to the 8086 as INT86. The details of such circuitry are described below in conjunction with FIGS. 4a and 4b.

(5) State Machine 79: This block comprises all the necessary logic to arbitrate the I/O accesses by the 8086 to be performed by the 6502 using 6502 hardware resources. This block is fully described below in conjunction with FIGS. 5 and 6.

In addition to the foregoing hardware elements, the present invention utilizes system software, namely a master control program (MCP) and several device handlers (DHs). The system software resides in memory 15 used by the 6502 as shown in FIG. 1.

When the MCP gets an interrupt, it examines the port emulator to find out why the interrupt occurred. If the operation is an I/O fetch, then based on whether the I/O is a read or a write, a call is made through a read or write vector to the appropriate device handler. Each device handler provides an entry point for each port for which it is responding.

Both the 8086 and the 6502 have access to the RAM 30 of the port emulator. When the 8086 attempts to read or write the I/O ports 30b, an interrupt generated by the CPU controller 47 informs the 6502 of a pending 8086 I/O access. The address of the I/O port is passed to the 6502 through the latches 21 and 22 of FIG. 3. The port address is saved in page zero of RAM 15 for the device handlers and the appropriate handler is called through the read vector or the write vector, as necessary. The device handler must then read or write the I/O ports appropriately for the operation being emulated. On writes, the new data byte is passed to the device handler in the 6502 accumulator. The MCP then stores the data byte at the correct location in RAM 30b.

State Machine 79

Figure 5:
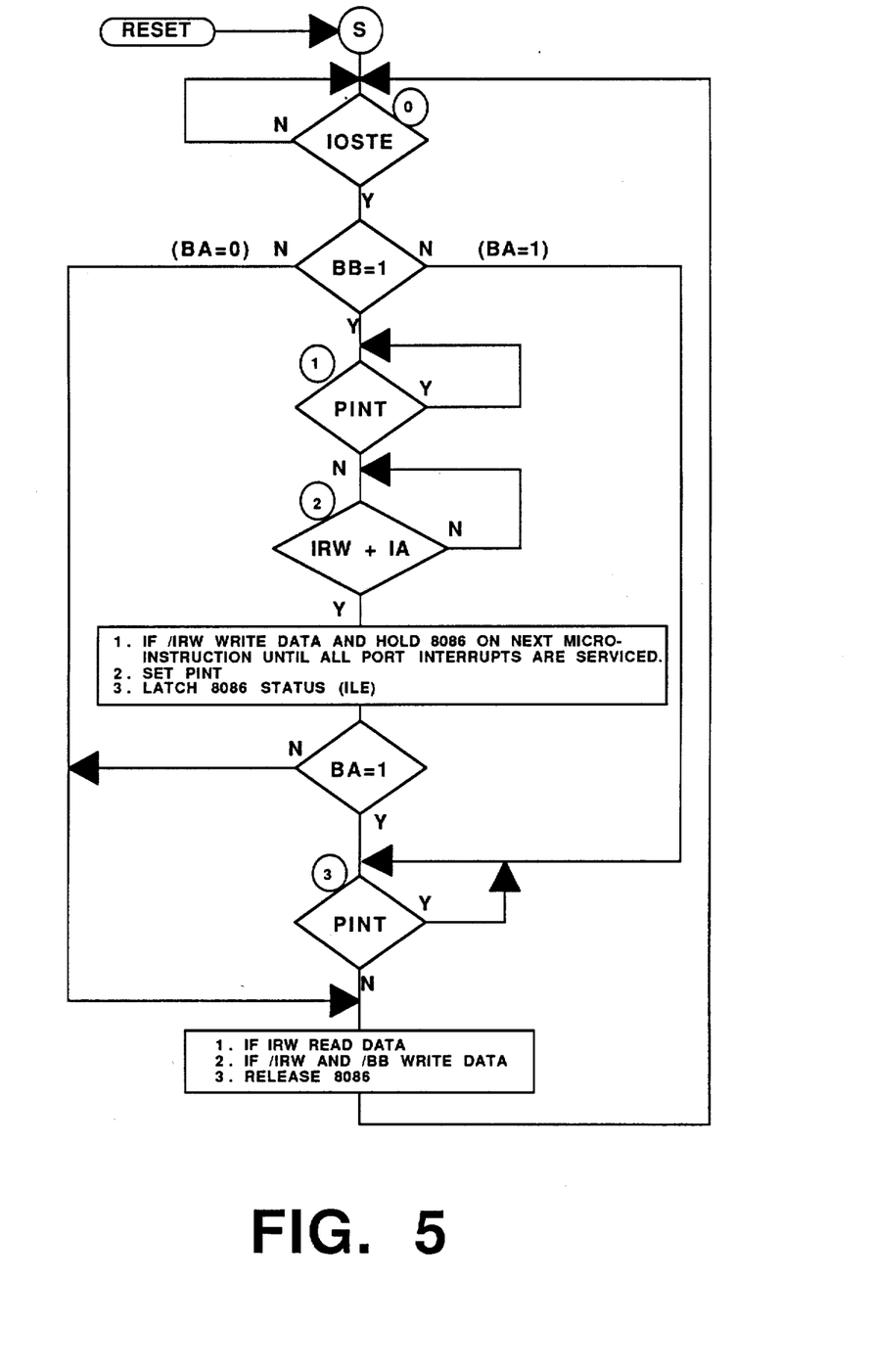
FIG. 5 is a flow chart showing the operation of the state machine used by the CPU controller.
Figure 6:
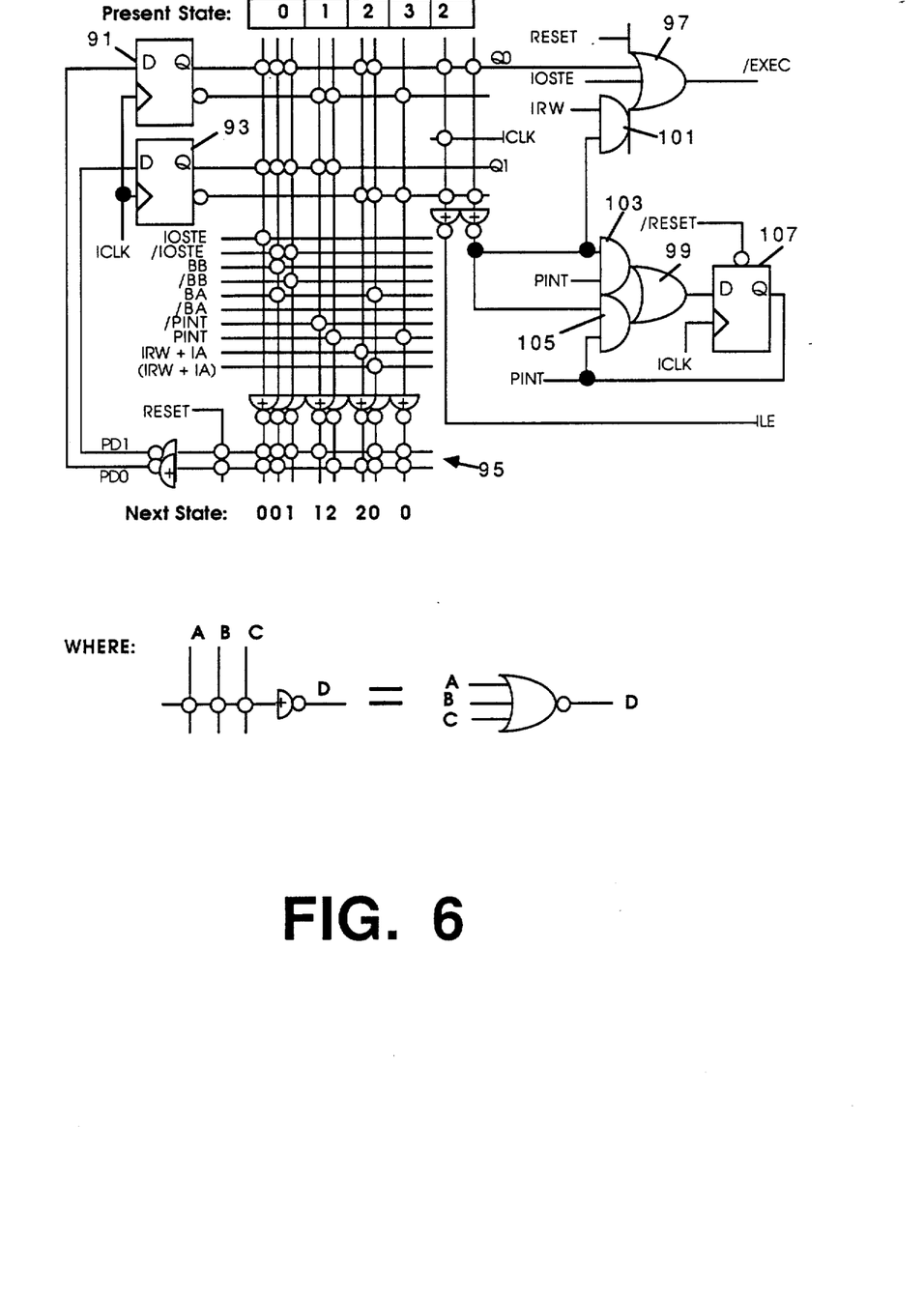
FIG. 6 is a schematic showing a preferred implementation of the state machine.

State machine 79 performs the function described in the flow chart of FIG. 5 implemented as shown in FIG. 6. Every 8086 I/O access is divided into two portions: (1) a RAM fetch (/DIO) to read the I/O control byte 30c as deposited by the 6502 into RAM locations BF400-BF7FF and (2) the 8086 I/O operation itself (DIO) to read I/O data byte 30b as deposited by the 6502 or to write data into RAM locations BF000-BF3FF.

Figure 4B:
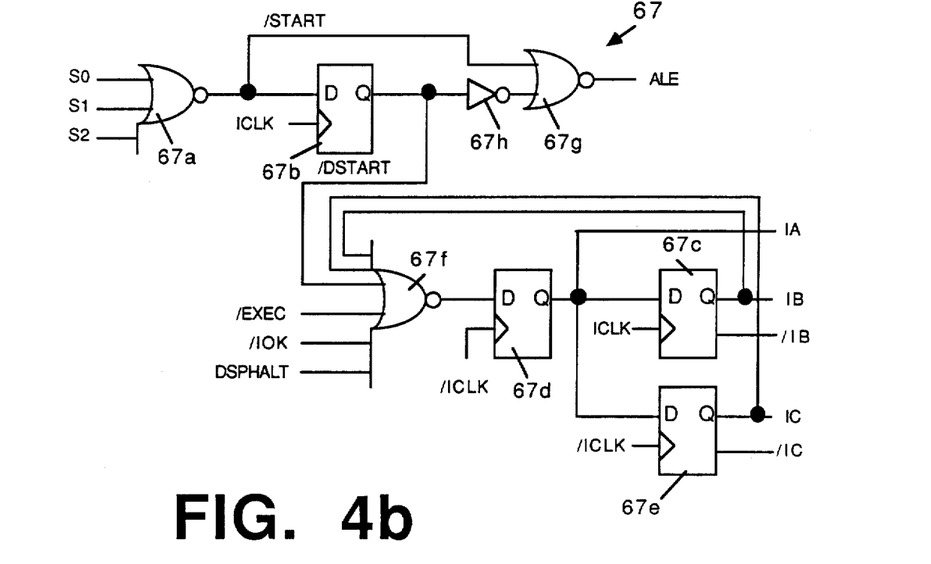
FIG. 4b is a schematic diagram showing the implementation of the internal ring counter used by the CPU controller.

During the first half of the I/O access, logic circuitry 77 as shown in FIGS. 4a and 4b performs a read to fetch the I/O control byte in RAM 30, while holding the 8086 by dis-asserting (PIO*/DIO) its READY line. Each control byte 30c contains the latest status information from the 6502 as to the serviceability of that particular I/O register. Bits 0–3 are used for bus registers residing in the low data bus, while bits 4–7 are used for registers residing in the high data bus. As shown in FIG. 4a, the bits within the two nibbles are further multiplexed into the signals BA and BB with the 8086 Read/Write (IRW) line as shown in the table below:

| BHE | A0 | IRW | BB | BA | Comments |
| --- | --- | --- | --- | --- | --- |
| 0 | 0 | 0 | D1 | D0 | Write: Even Byte |
| 1 | 0 | 0 | D1 + D5 | D0 + D4 | Word |
| 1 | 1 | 0 | D5 | D4 | Odd Byte |
| 0 | 0 | 1 | D3 | D2 | Read: Even Byte |
| 1 | 0 | 1 | D3 + D7 | D2 + D6 | Word |
| 1 | 1 | 1 | D7 | D6 | Odd Bite |

BB instructs the state machine to interrupt the 6502 whenever it encounters an access to that I/O register as determined by D1, D3, D5, D7, $\overline{IRW}$ BHE, IRW, $\overline{A0}$ NAND gate 61 and flip-flop 62 whose D input is the output of NAND gate 61 and whose enable input is IOGO which is generated by the logic circuitry 65 comprising AND gates 65a and 65b, NOR gate 65c, flip-flop 65d, inverter 65e, AND gates 65f and 65g. Inputs IB, IC and $\overline{IC}$ to logic circuitry 65 are generated by internal ring counter 67 shown in FIG. 4b comprising NOR gate 67a, flip-flops 67b, 67c, 67d and 67e, NOR gates 67f and 67g and inverter 67h. BA instructs the state machine to halt the 8086 until all I/O interrupts have been serviced by the 6502 as determined by D0, D2, D4 and D6. The logic circuitry for BB is identical to that shown in FIG. 4a for BA. The table below describes all four possible states:

| BB | BA | Action |
|----|----|--------|
| 0 | 0 | Register has been serviced, do not interrupt, or halt. |
| 0 | 1 | Do not interrupt, but hold 8086 until prior interrupt is serviced. |
| 1 | 0 | Interrupt (set port interrupt flag PINT) and allow 8086 to execute the I/O instruction. |
| 1 | 1 | Interrupt and wait until all I/O interrupts have been serviced. |

At the beginning of the second half of each I/O access, the 8086 control and instruction decode logic 77 issues an IOSTE (I/O State Machine Enable) signal to trigger the processing of the I/O access by state machine 79. The state machine examines BB, BA, IRW, IA and PINT to determine the course of action to be taken as described below with reference to FIG. 5.

(1) During the transition between states zero and one, the state of the control byte is sampled: if BB=0 and BA=0, the instruction is not executed, since it has already been serviced. If BB=0 and BA=1 the instruction is executed immediately if there is no pending port interrupt or not executed until PINT is cleared by the 6502 in state three.

(2) If BB=1 during state one, the state machine waits until PINT is cleared by the 6502 on a pending port interrupt in order to re-set it in state two.

(3) On state two, the state machine issues the IBM Status Latch Enable signal (ILE), sets PINT and on I/O write enables the internal ring counter of FIG. 4b by lowering the signal /EXEC to perform the I/O write. Since the ring counter might be held by a 6502 access (or by other means), the state machine does not proceed to state three until an IA (the internal equivalent to the 8086's micro-cycle, T2) actually occurs.

(4) On state two and I/O writes, the 8086 is allowed its I/O access, but is immediately held again in state three, if there is a pending port interrupt (PINT=1) and BA=1.

(5) During the transition between states two and three, the state of the control byte is sampled once more to determine whether to halt on a pending port interrupt (BA=1) or execute the instruction immediately (BA=0).

(6) Reads are only executed upon termination of the I/O access while writes are either executed in state two (BB=1) or upon termination of the I/O access (BB=0). The 8086 is only released upon termination of the I/O access.

As seen above, whenever BB is true, i.e. a new access has occurred to that register, the state machine issues a command (ILE) to latch the 8086 I/O status. Addresses 0–15 and HBE*/IA0 are latched into the 8086 status register readable by the 6502. The table below lists all the branching conditions for the state machine:

| Present State | Branch Condition | Next State | Comments |
|---------------|------------------|------------|----------|
| 0 | /IOSTE | 0 | Wait on IOSTE |
| 0 | IOSTE*/BB*/BA | 0 | No Action |
| 0 | IOSTE*/BB*BA | 3 | Go to State 3 |
| 0 | IOSTE*BB | 1 | Go to State 1 |
| 1 | PINT | 1 | Wait on PINT |
| 1 | /PINT | 2 | Go to State 2 |
| 2 | /IRW*/IA | 2 | Execute IO Writes |
| 2 | (IRW + IA)*/BA | 0 | Go to State 0 |
| 2 | (IRW*IA)*BA | 3 | Go to State 3 |
| 3 | PINT | 3 | Wait on PINT |
| 3 | /PINT | 0 | Goto State 0 |

The two output qualifers are ILE and EXEC. ILE (State 2) latches the 8086 status register and sets the PINT flag. EXEC, when dis-asserted, halts execution of the micro-instruction cycle during the following conditions: (1) RESET, power-on, (2) IOSTE, IO start, (3) State 1, waiting on PINT, (4) State 2, unless writing, (5) State 3, waiting on PINT.

A preferred embodiment of state machine 79 is shown in FIG. 6. As illustrated in FIG. 6, state machine 79 comprises flip-flops 91 and 93, gate array 95, or gates 97 and 99, AND gates 101, 103 and 105 and flip-flop 107. Gate array 95 comprises a plurality of NOR gates whose inputs are IOSTE, BB, BA, PINT, IRW, IA and RESET and whose outputs include inputs to gates 101, 103 and 105 which are used to generate $\overline{EXEC}$ PINT and ILE.

The manner in which such signals are generated will be apparent to those skilled in the art from FIG. 6. Of course, state machine 79 can be implemented using circuitry other than that illustrated in FIG. 6.

We claim:

1. An interfacing apparatus coupling first and second microprocessors which operate under first and second operating systems respectively to enable peripheral devices to be used for input/output operations in conjunction with the first microprocessor operating under the first operating system, to be used for input/output operations in conjunction with the second microprocessor operating under the second operating system, said first and second microprocessors having independent address buses, and data buses, said apparatus including said second microprocessor, a memory, a bus coupling said memory to and to a controller means, said controller means for controlling the input/output operations of said first and second microprocessors, said controller means comprising:

control and instruction decode logic means coupled to said second microprocessor for decoding micro-instructions generated by said second microprocessor and generating signals which allow the first microprocessor to control the second microprocessor;

register means coupled to said memory and said control and instruction decode means, said register means for latching data on said buse for use by said control and instructions decode logic means;

state machine means coupled to said register means, said control and instruction decode logic means and said second microprocessor for arbitrating the input/output accesses by the second microprocessor to be performed by the first processor using peripheral devices of said first microprocessor.

2. The apparatus defined by claim 1 wherein said control and instruction decode logic means comprises means for reading input/output control bytes and data bytes in said memory, means for holding operation of said second microprocessor, said input/output control bytes containing the status of said corresponding input/output data bytes as determined by said first microprocessor.

3. The apparatus defined by claim 1 wherein said state machine comprises a state 0, a state 1, a state 2 and a state 3, and transitions between state 0, state 1, state 2 and state 3 occur on the following branch conditions:

| Present State | Branch Condition | Next State |
| --- | --- | --- |
| 0 | /IOSTE | 0 |
| 0 | IOSTE*/BB*/BA | 0 |
| 0 | IOSTE*/BB*BA | 3 |

-continued

| Present State | Branch Condition | Next State |
| --- | --- | --- |
| 0 | IOSTE*BB | 1 |
| 1 | PINT | 1 |
| 1 | /PINT | 2 |
| 2 | /IRW*/IA | 2 |
| 2 | (IRW + IA)*/BA | 0 |
| 2 | (IRW*IA)*BA | 3 |
| 3 | PINT | 3 |
| 3 | /PINT | 0 |

* * * * *

UNITED STATES PATENT AND TRADEMARK OFFICE
CERTIFICATE OF CORRECTION

PATENT NO. : 4,888,680

DATED : December 19, 1989

INVENTOR(S) : Sander et al.

It is certified that error in the above-identified patent and that said Letters Patent is hereby corrected as shown below:

| | | |
|---|---|---|
| col. 06, line 38 | delete "said second microprocessor" | |
| col. 06, line 39 | after "to" (1st occurrence) | insert --said second microprocessor-- |
| col. 06, line 51 | delete "buse" | insert --bus-- |

Signed and Sealed this

Eighteenth Day of June, 1991

Attest:

HARRY F. MANBECK, JR.

Attesting Officer

Commissioner of Patents and Trademarks